United States Patent
Macfarlane

(10) Patent No.: US 9,415,935 B1
(45) Date of Patent: Aug. 16, 2016

(54) AUTOMATED INVENTORY QUALITY CONTROL

(75) Inventor: Kenneth C. Macfarlane, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 232 days.

(21) Appl. No.: 13/601,662

(22) Filed: Aug. 31, 2012

(51) Int. Cl.
| | | |
|---|---|---|
| *G06F 7/00* | (2006.01) | |
| *B65G 1/137* | (2006.01) | |
| *B25J 9/16* | (2006.01) | |
| *G06Q 10/08* | (2012.01) | |
| *G05B 15/02* | (2006.01) | |

(52) U.S. Cl.
CPC ............ *B65G 1/1373* (2013.01); *B25J 9/1602* (2013.01); *G05B 15/02* (2013.01); *G06Q 10/08* (2013.01); *Y10S 901/01* (2013.01)

(58) Field of Classification Search
CPC ..... B65G 1/1373; B25J 9/1602; G05B 15/02; Y10S 901/01; G06Q 10/08
See application file for complete search history.

(56) References Cited

U.S. PATENT DOCUMENTS

| | | | |
|---|---|---|---|
| 6,705,523 B1* | 3/2004 | Stamm et al. ................. | 235/385 |
| 7,825,954 B2* | 11/2010 | Zhang et al. .................. | 348/169 |
| 8,606,659 B2* | 12/2013 | Aggarwal et al. .............. | 705/28 |
| 2004/0010486 A1* | 1/2004 | MacQueen et al. ............ | 707/1 |
| 2004/0249497 A1* | 12/2004 | Saigh et al. .................... | 700/216 |
| 2007/0187183 A1* | 8/2007 | Saigh et al. .................... | 186/53 |
| 2007/0203811 A1* | 8/2007 | Hoopes ................ | G06Q 10/087 705/28 |
| 2008/0015958 A1* | 1/2008 | Vanker et al. ................... | 705/28 |
| 2008/0082428 A1* | 4/2008 | Stein .................... | G06Q 10/087 705/28 |
| 2008/0082429 A1* | 4/2008 | Stein .................... | G06Q 10/087 705/28 |
| 2008/0120205 A1* | 5/2008 | Hoopes et al. ................. | 705/28 |
| 2009/0094140 A1* | 4/2009 | Kwan ............... | 705/28 |
| 2011/0052001 A1* | 3/2011 | Tan et al. ...................... | 382/103 |
| 2011/0055172 A1* | 3/2011 | Tan et al. ...................... | 707/692 |
| 2012/0127314 A1* | 5/2012 | Clements ...................... | 348/150 |
| 2013/0113626 A1* | 5/2013 | Sickenius ..................... | 340/571 |
| 2013/0113930 A1* | 5/2013 | Sickenius ..................... | 348/143 |
| 2013/0182114 A1* | 7/2013 | Zhang et al. .................. | 348/150 |

* cited by examiner

*Primary Examiner* — Mussa A Shaawat
(74) *Attorney, Agent, or Firm* — Baker Botts L.L.P.

(57) ABSTRACT

An apparatus for determining discrepancies between physical inventory and virtual inventory includes a memory and a processor. The memory can store a virtual inventory associated with an inventory bin, and an image representing a physical inventory associated with the inventory bin. The processor is coupled to the memory and can determine from the image a physical inventory comprising one or more units of inventory from the inventory bin. The processor can also determine discrepancies between the determined physical inventory of the inventory bin and the virtual inventory associated with the inventory bin.

20 Claims, 4 Drawing Sheets

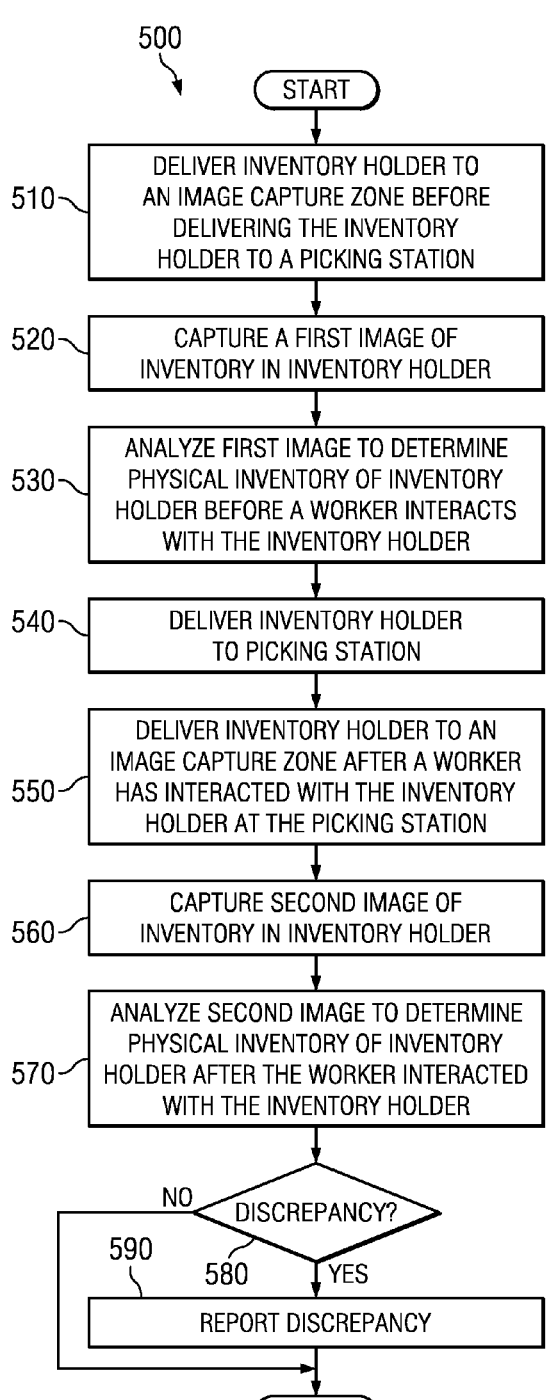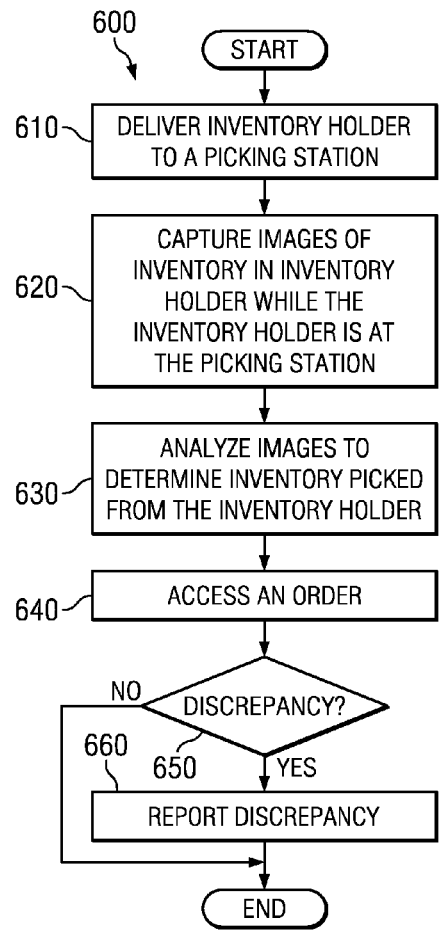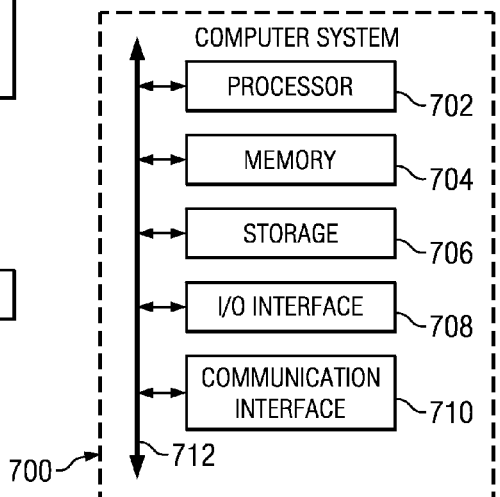
FIG. 5
FIG. 6
FIG. 7

AUTOMATED INVENTORY QUALITY CONTROL

BACKGROUND

Modern inventory systems face increasing demands to efficiently fulfill orders despite increasing complexity and diversity of inventories and orders. Inventory systems, however, often suffer from misplaced, missing, or otherwise incorrect inventory that may lower system throughput, cause unfinished or delayed tasks, and result in unacceptable response times. For example, a certain inventory item may be placed in a wrong location and thus may not be located in order to fulfill an order. As another example, a worker may remove an incorrect inventory item from a location when attempting to fulfill an order. Accordingly, inventory systems face the challenge of effectively controlling inventory in order to meet rising demands.

BRIEF DESCRIPTION OF THE DRAWINGS

For a more complete understanding of the present disclosure and its features and advantages, reference is now made to the following description, taken in conjunction with the accompanying drawings, in which:

FIG. 5 illustrates another example method for providing automated inventory quality control, which may be performed by the example system of FIG. 1 according to certain embodiments of a present disclosure;

FIG. 6 illustrates another example method for providing automated inventory quality control, which may be performed by the example system of FIG. 1 according to certain embodiments of a present disclosure; and FIG. 7 illustrates an example computer system that may be used for one or more portions of the example system of FIG. 1, according to certain embodiments of the present disclosure.

DESCRIPTION OF EXAMPLE EMBODIMENTS

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Typical inventory systems face many quality control challenges due to human interaction with the inventory. For example, an inventory item may be placed in an incorrect bin by a worker when it is being stocked or after it has been returned by a customer. As another example, a worker may remove an incorrect inventory item from a rack of bins when an order is being filled. As yet another example, a retailer may be the victim of theft in which inventory items are removed from bins without the retailer's knowledge. These and other inventory quality control issues are undesirable because they may reduce system throughput, increase costs, and result in unacceptable response times.

Certain embodiments of the present disclosure provide automated inventory quality control by utilizing robotics and imaging to detect the inventory of an inventory holder. In certain embodiments, one or more images of the inventory of an inventory holder are utilized to detect discrepancies between a physical inventory and a virtual inventory. In other embodiments, one or more images of the inventory of an inventory holder are utilized to detect whether a worker has picked the correct inventory items according to an order. Thus, the disclosed embodiments are able to detect and flag inventory quality control issues so they may be remedied. FIGS. 1 through 7 below illustrate systems and methods for providing automated inventory quality control according to certain embodiments of the present disclosure.

Figure 1:
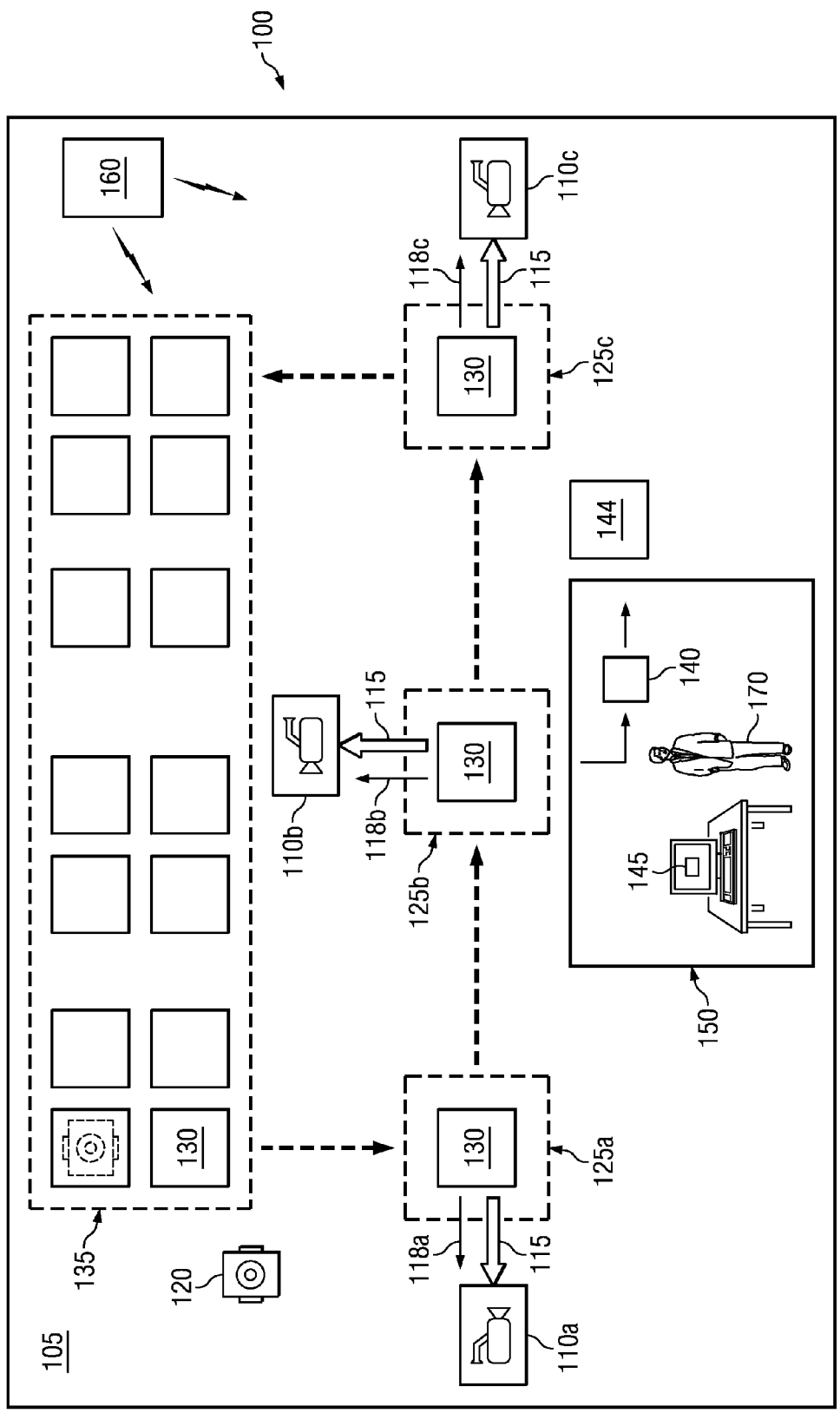
FIG. 1 illustrates an example system for providing automated inventory quality control, according to certain embodiments of the present disclosure.

FIG. 1 illustrates an inventory system 100 for automated inventory quality control using robotics and imaging. System 100 includes a workspace 105, one or more image capture devices 110, one or more mobile drive units 120, one or more inventory holders 130, and a picking station 150. Mobile drive units 120 are communicatively coupled to a management module 160. Inventory holders 130 are stored in an array of inventory holders 135. Image capture devices 110 are located in or in close proximity to image capture zones 125.

In general, mobile drive units 120 deliver inventory holders 130 to various locations within workspace 105. For example, mobile drive unit 120 may retrieve an inventory holder 130 and deliver the inventory holder 130 to a picking station 150. At picking station 150, a worker 170 may remove inventory items from inventory holder 130 according to an electronic order 145. The picked inventory items from inventory holder 130 may constitute a picked order 140. Picked order 140 may be placed in order holder 144 where it may ultimately be shipped or otherwise provided to a customer.

Mobile drive unit 120 may also deliver inventory holders 130 to one or more image capture zones 125 within workspace 105 where imaging may be utilized for automated inventory quality control. For example, mobile drive unit 120 may deliver inventory holder 130 to an image capture zone 125 where an image capture device 110 utilizes an image capture process 115 to capture one or more images 118 of the inventory stored in inventory holder 130. The one or more images 118 captured while inventory holder 130 is located within image capture zone 125 may be utilized to determine whether the inventory in inventory holder 130 is correct. In one example, the one or more images 118 captured from inventory holder 130 while it is located within image capture zone 125 may be utilized to determine any discrepancies between the physical inventory of inventory holder 130 and a virtual inventory associated with inventory holder 130. In another example, the one or more images 118 captured from inventory holder 130 while it is located within image capture zone 125 may be utilized to determine whether the correct inventory items for electronic order 145 were removed from inventory holder 130.

Workspace 105 represents an area associated with inventory system 100 in which mobile drive units 120 can move and/or inventory holders 130 can be stored. For example, workspace 105 may represent all or part of the floor of a mail-order warehouse in which inventory system 100 operates. Although FIG. 1 shows, for the purposes of illustration, an embodiment of inventory system 100 in which workspace 105 includes a fixed, predetermined, and finite physical space, particular embodiments of inventory system 100 may include mobile drive units 120 and inventory holders 130 that are configured to operate within a workspace 105 that is of variable dimensions and/or an arbitrary geometry. While FIG. 1 illustrates a particular embodiment of inventory system 100 in which workspace 105 is entirely enclosed in a building, alternative embodiments may utilize workspaces 105 in which some or all of the workspace 105 is located outdoors, within a vehicle (such as a cargo ship), or otherwise unconstrained by any fixed structure.

Moreover, in particular embodiments, workspace 105 may include multiple portions that are physically separated from one another, including but not limited to separate floors, rooms, buildings, and/or portions divided in any other suitable manner. Mobile drive units 120 may be configured to utilize alternative conveyance equipment such as vertical or horizontal conveyors, trucks, ferries, gondolas, escalators, and/or other appropriate equipment suitable to convey mobile drive units 120 between separate portions of workspace 105.

Image capture device 110 may be any appropriate device for capturing images 118 of the inventory of inventory holder 130. In one embodiment, image capture device 110 is a video camera. For example, image capture device 110 may be a high-definition video camera that captures images 118 in the form of a high-definition video data stream of inventory holder 130 while it is located in or while it passes through image capture zone 125. In another embodiment, image capture device 110 may be any appropriate camera that captures still images. For example, image capture device 110 may be a high-definition camera that captures one or more still images 118 of inventory holder 130 while it is located in or while it passes through image capture zone 125. While particular examples of image capture device 110 have been discussed, the disclosure is not limited to any particular type or form of image capture device.

Image capture device 110 utilizes an image capture process 115 for capturing one or more images 118 of inventory holder 130. In certain embodiments, image capture process 115 may refer to capturing a single still image 118 of inventory holder 130 while it is stationary inside image capture zone 125 or as inventory holder 130 is passing through image capture zone 125. In another embodiment, image capture process 115 may refer to capturing multiple images 118 of inventory holder 130 while it is stationary inside image capture zone 125 or as inventory holder 130 is passing through image capture zone 125. For example, multiple still images 118 or multiple images in the form of video data may be captured of inventory holder 130 while it is stationary inside image capture zone 125 or as inventory holder 130 is passing through image capture zone 125.

Image capture zone 125 is any location within workspace 105 where image capture device 110 captures one or more images 118 of the inventory stored in inventory holder 130. For example, workspace 105 may include three image capture zones 125a-125c. Image capture zone 125a may be a location that inventory holder 130 passes through after departing array 135 but before arriving at picking station 150. Image capture zone 125b may be a location that is proximate to or inside picking station 150. Image capture zone 125c may be a location that inventory holder 130 passes through after departing from picking station 150 but before being returned to array 135. In some embodiments, image capture zones 125a and 125b may be the same image capture zone 125. That is, mobile drive unit 120 may deliver inventory holder 130 through a particular image capture zone 125 such as image capture zone 125a both before arriving at picking station 150 and after departing picking station 150. While the illustrated embodiment of FIG. 1 includes three image capture zones 125, the disclosure anticipates workspace 105 including only a single image capture zone 125 or any appropriate number of image capture zones 125.

Mobile drive units 120 represent any suitable combination of devices and components operable to move inventory holders 130 and/or order holders 144 within workspace 105. Mobile drive units 120 may be designed to couple, interface, dock or otherwise connect with inventory holders 130 and/or order holders 144. For example, mobile drive units 120 may be configured to move beneath a given inventory holder 130 and/or order holder 144 and lift the holder using a docking head 122 or other appropriate coupling structure. Mobile drive units 120 include one or more wheels 124 and may be capable of moving to any appropriate location within workspace 105.

Mobile drive units 120 may include appropriate communication devices to communicate information to and from management module 160, other mobile drive units 120, and/or picking stations 150. In some embodiments, mobile drive units 120 may communicate with management module 160 and/or other mobile drive units 120 using Wi-Fi (IEEE 802.11), Bluetooth (IEEE 802.15), Infrared Data Association standards, or any other appropriate wireless communications protocol. Mobile drive units 120 may include appropriate sensors to detect fixed locations and/or other mobile drive units 120 within workspace 105. Mobile drive units 120 may thereby facilitate movement and/or avoid collisions. Mobile drive units 120 may communicate information to management module 160 to assist management module 160 in the management of inventory system 100. For example, mobile drive unit 120 may transmit its location relative to a fixed location within workspace 105 to management module 160. In some embodiments, mobile drive units 120 represent independent self-powered robotic devices. Alternatively or in addition, mobile drive units 120 may represent multiple types of mobile drive units. Mobile drive units 120 in various embodiments may refer to any appropriate means of transporting inventory items 130 to locations within workspace 105. For example, mobile drive units 120 may refer to conveyance systems that make use of conveyor belts, cranes, or other apparatus to move inventory items and/or inventory holders 130 within workspace 105.

Inventory holders 130 store inventory items. In some embodiments, inventory holders 130 include multiple storage bins each capable of holding one or more inventory items. Alternatively or in addition, inventory holders 130 may include a rack of shelves, each shelf capable of carrying one or more inventory items. Inventory holders 130 are capable of coupling and/or docking with mobile drive units 120 and being carried, rolled, or otherwise moved by mobile drive units 120. Inventory holder 130 may include a plurality of faces. Each bin of inventory holder 130 may be accessible through one or more faces of the inventory holder 130. For example, in some embodiments, inventory holder 130 may include four faces, and mobile drive unit 120 may be operable to rotate inventory holder 130 at appropriate times within workspace 105 to present a particular face containing the inventory items needed at picking station 150. A particular embodiment of inventory holder 130 is discussed further below in reference to FIG. 2.

Figure 2:
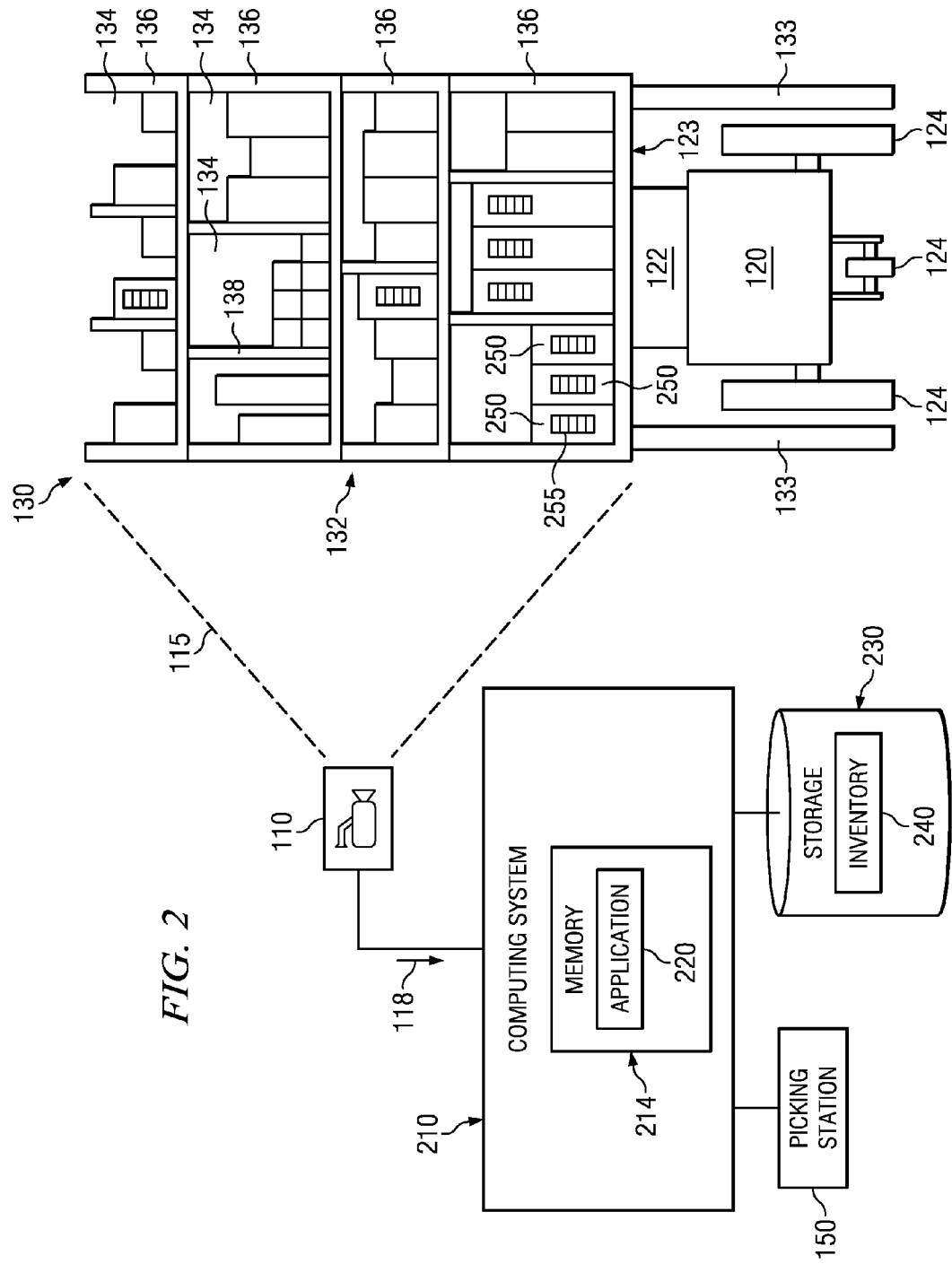
FIG. 2 illustrates capturing an image of the inventory of an inventory holder of the example system of FIG. 1, according to certain embodiments of the present disclosure.

FIG. 2 illustrates an example of image capture device 110 capturing one or more images 118 of inventory holder 130 while it is located in an image capture zone 125. Image capture device 110 is communicatively coupled to a computing system 210. Computing system 210 is communicatively coupled to picking station 150 and one or more storage devices 230. Image capture device 110 utilizes image capture process 115 as described above to capture one or more images 118 of the inventory of inventory holder 130. A particular embodiment of computing system 210 is described further below in reference to FIG. 7.

FIG. 2 also illustrates in greater detail the components of a particular embodiment of inventory holder 130. In particular, FIG. 2 illustrates the structure and contents of one side of an example inventory holder 130. In a particular embodiment, inventory holder 130 may comprise any number of faces with similar or different structure. As illustrated, inventory holder 130 includes a frame 132, a plurality of legs 133, and a docking surface 123.

Frame 132 holds inventory items 250. Frame 132 provides storage space for storing inventory items 250 external or internal to frame 132. The storage space provided by frame 132 may be divided into a plurality of inventory bins 134, each capable of holding inventory items 250. Inventory bins 134 may include any appropriate storage elements, such as bins, compartments, or hooks.

In a particular embodiment, frame 132 is composed of a plurality of trays 136 stacked upon one another and attached to or stacked on a base. In such an embodiment, inventory bins 134 may be formed by a plurality of adjustable dividers 138 that may be moved to resize one or more inventory bins 134. In alternative embodiments, frame 132 may represent a single inventory bin 134 that includes a single tray 136 and no adjustable dividers 138. Inventory items 250 may be stored on such an inventory holder 130 by being placed on frame 132. In general, frame 132 may include storage internal and/or external storage space divided into any appropriate number of inventory bins 134 in any appropriate manner.

Additionally, in a particular embodiment, frame 132 may include a plurality of device openings that allow mobile drive unit 120 to position docking head 122 adjacent to docking surface 123. The size, shape, and placement of the device openings of inventory holder 130 may be determined based on the size, the shape, and other characteristics of the particular embodiment of mobile drive unit 120 and/or inventory holder 130 utilized by inventory system 100. For example, in the illustrated embodiment, frame 132 includes four legs 133 that form a device opening and allow mobile drive unit 120 to position itself under frame 132 and adjacent to docking surface 123. The length of legs 133 may be determined based on a height of mobile drive unit 120.

Docking surface 123 comprises a portion of inventory holder 130 that couples to, abuts, and/or rests upon a portion of docking head 122, when mobile drive unit 120 is docked to inventory holder 130. Additionally, docking surface 123 supports a portion or all of the weight of inventory holder 130 while inventory holder 130 is docked with mobile drive unit 120. The composition, shape, and/or texture of docking surface 123 may be designed to facilitate maneuvering of inventory holder 130 by mobile drive unit 120. For example, as noted above, in particular embodiments, docking surface 123 may comprise a high-friction portion. When mobile drive unit 120 and inventory holder 130 are docked, frictional forces induced between docking head 122 and this high-friction portion may allow mobile drive unit 120 to maneuver inventory holder 130. Additionally, in particular embodiments, docking surface 123 may include appropriate components suitable to receive a portion of docking head 122, couple inventory holder 130 to mobile drive unit 120, and/or facilitate control of inventory holder 130 by mobile drive unit 120.

Inventory items 250 may be any item of any form that may be stored in inventory holder 130. As examples for illustrative purposes only, inventory items 250 may be any form of electronics, household goods, grocery items, any form of media such as books, movies, or music, or any other appropriate item. Some embodiments of inventory items 250 may include a barcode 255 that is located on the outside of inventory item 250 or packaging of inventory item 250. Barcode 255 may be any type of transaction code. For example, barcode 255 may be in the form of a linear bar code (or a one-dimensional bar code), such as a code 93, a code 128, or a universal product code (UPC); a matrix bar code (or a two dimensional bar code), such as a quick response (QR) code, a MaxiCode, or a ShotCode; an RFID code; a sequence of numbers and/or symbols; any other transaction code; or any combination of the preceding. Barcode 255 may include any information that allows inventory item 250 to be identified.

Returning to FIG. 1, picking station 150 represents one or more locations designated for the completion of particular tasks involving inventory items 250. Such tasks may include the removal of inventory items 250 from inventory holders 130, the introduction of inventory items 250 into inventory holders 130, the counting of inventory items 250 in inventory holders 130, the decomposition of inventory items 250 (e.g. from pallet- or case-sized groups to individual inventory items), and/or the processing or handling of inventory items 250 in any other suitable manner. In particular embodiments, picking station 150 may just represent the physical locations where a particular task involving inventory items 250 can be completed within workspace 105. In alternative embodiments, picking station 150 may represent both the physical location and also any appropriate equipment for processing or handling inventory items, such as scanners for monitoring the flow of inventory items in and out of inventory system 100, communication interfaces for communicating with management module 160 and/or computing system 210, and/or any other suitable components. Picking station 150 may be controlled, entirely or in part, by human operators or may be fully automated. Moreover, the human or automated operators of picking station 150 may be capable of performing certain tasks to inventory items, such as packing or counting inventory items 250, as part of the operation of inventory system 100.

Order holders 144 store picked order 140. For example, order holders 144 may represent various pallets, bins, receptacles, tables, conveyors, and/or other structures capable of holding and/or storing picked order 140. In some embodiments, order holders 144 may be an inventory holder 130 that is designated to store picked order 140. Order holders 144 may store picked order 140 until those orders are ready to be shipped. In some embodiments, order holders 144 may themselves be loaded for shipment. For example, order holders 144 may be shipping containers, pallets, or other receptacles suitable for shipment. Order holders 144 may simply hold picked order 140 until those orders are ready to be removed from order holders 144 for shipment. Alternatively or in addition, order holders 144 may store orders received by inventory system 100 that may be filled from inventory holders 130 at picking station 150.

In some embodiments, order holders 144 are substantially similar to inventory holders 130. For example, in some embodiments, inventory holders 130 may be designated as order holders 144 by management module 160. Moreover, a particular component may at different times serve as an inventory holder 130. In some embodiments, a component may serve simultaneously as both an inventory holder 130 and an order holder 144 by storing both inventory items 250 and picked order 140. In some embodiments, order holders 144 may be capable of storing, holding and/or enclosing shipping containers such as boxes, pallets, or other shipping containers in which orders can be delivered to a given destination. In some embodiments, order holders 144 may not include bins or partitions and may instead hold only a single picked order 140 or group of picked orders 140 that are stored in mass. For example, order holder 144 may support, include or represent a pallet in which one or more orders are stored. Moreover, in particular embodiments, order holder 144 may represent a shipping container on or in which stored picked orders 140 may be shipped.

Management module 160 represents any suitable combination of hardware, software, and controlling logic operable to coordinate the operation of various components within system 100. In some embodiments, management module 160 may include one or more processors, one or more memory modules, and one or more communication interfaces. Logic may be encoded on one or more non-transitory computer-readable media and may be executed by the one or more processors. Management module 160 may include logic to schedule and execute various tasks involving the movement and processing of inventory items within system 100. For example, management module 160 may assign tasks to mobile drive units 120 and/or picking station 150. Management module 160 may include logic to facilitate coordination of the movement of mobile drive units 20 within workspace 105 in order to complete the assigned tasks. Management module 160 may include one or more communication interfaces to send information to and receive information from mobile drive units 120 and/or computing system 210. For example, management module 160 may transmit, to one or more mobile drive units 120, task assignment information, destination information, path planning information, reservation information, and/or any other appropriate information. It should be noted that while management module 160 is depicted as a separate component within inventory system 100, the functionality performed by management module 160 may be distributed over several devices. For example, the operations of management module 160 may be performed by mobile drive units 120 and/or other appropriate components of inventory management system 100 such as computing system 210. As a result, any or all of the interaction between a particular mobile drive unit 120 and management module 160 that is described herein may, in particular embodiments, represent peer-to-peer communication between mobile drive units 120.

Management module 160 may determine one or more inventory items responsive to electronic order 145 for one or more inventory items 250. Management module 160 may determine which inventory holders 130 store those inventory items 250. Management module 160 may then assign tasks to transport those inventory holders 130 to one or more image capture zone 125 and/or picking station 150. Inventory holders 130 may transport inventory items needed to complete electronic order 145. Based on their respective task assignments, mobile drive units 120 may transport the inventory holders 130 with inventory items 250 responsive to electronic order 145 to picking station 150.

Referring to FIG. 1 in conjunction with FIG. 2, in operation of example embodiments, mobile drive unit 120 delivers inventory holder 130 from array 135 first to image capture zone 125a and then to picking station 150 where inventory item 250 may be removed according to electronic order 145. While inventory holder 130 is located in (e.g., either stationary or passing through) image capture zone 125a, image capture device 110a captures one or more images 118a of inventory items 250 located in inventory holder 130. The captured images 118a may be transmitted to computing system 210 where an application 220 may analyze the captured one or more images 118a in order to determine any quality control issues with inventory holder 130. For example, application 220 may analyze captured images 118a to determine a physical inventory of inventory holder 130. Application 220 may also access a virtual inventory 240 associated with inventory holder 130 and compare the virtual inventory 240 with the determined physical inventory. As a result, application 220 may detect discrepancies between virtual inventory 240 and the determined physical inventory of inventory holder 130. Particular embodiments of the determined physical inventory of inventory holder 130 and virtual inventory 240 are illustrated further below in reference to FIGS. 3A-3B.

Mobile drive unit 120 may also deliver inventory holder 130 to image capture zone 125b that is proximate to or inside picking station 150. In some embodiments, mobile drive unit 120 delivers inventory holder 130 to image capture zone 125b after passing through image capture zone 125a. In other embodiments, mobile drive unit 120 delivers inventory holder 130 to image capture zone 125b directly from array 135. While located in (e.g., while stationary in or passing through) image capture zone 125b, image capture device 110b captures one or more images 118b of inventory items 250 located in inventory holder 130.

The captured images 118b may be transmitted to computing system 210 where an application 220 may analyze the captured one or more images 118b in order to determine any quality control issues with inventory holder 130. For example, application 220 may analyze captured images 118b to determine whether the correct inventory item(s) 250 have been removed from inventory holder 130 according to electronic order 145. This may be accomplished in any appropriate manner. In one example, application 220 may analyze an image 118a associated with each inventory item 250 that is removed from inventory holder 130 and compare it with electronic order 145. If the removed inventory item 250 is not included in electronic order 145, an indication (e.g., visual, audible, etc.) may be presented to worker 170 in picking station 150.

In another example, application 220 may analyze a first image 118a taken when inventory holder 130 first arrived at image capture zone 125b and a second image 118a taken after worker 170 completes his/her interaction with inventory holder 130. Application 220 may then determine from the analyzed images a physical inventory of inventory holder 130 before worker 170 interacts with inventory holder 130 and a physical inventory of inventory holder 130 after worker 170 interacts with inventory holder 130. Application 220 may determine, by comparing these two determined physical inventories and electronic order 145, whether correct inventory item(s) 250 have been removed from inventory holder 130. Example embodiments of determining inventory of inventory holder 130 from images 118 are discussed further below.

Mobile drive unit 120 may also deliver inventory holder 130 to image capture zone 125c after departing from picking station 150 but before arriving at array 135. As mentioned above, image capture zone 125c may be image capture zone 125b in some embodiments. While inventory holder 130 is located in (e.g., either stationary or passing through) image capture zone 125c, image capture device 110c captures one or more images 118c of inventory items 250 located in inventory holder 130. The captured images 118c may be transmitted to computing system 210 where application 220 may analyze the captured one or more images 118c in order to determine any quality control issues with inventory holder 130. In one embodiment, a physical inventory of inventory holder 130 is determined from images 118*c* and compared to a physical inventory of inventory holder 130 determined from images 118*b* captured in image capture zone 125*a*. As such, discrepancies in the inventory of inventory holder 130 due to mistakes by worker 170 in picking station 150 may be discovered. Determining discrepancies in the inventory of inventory holder 130 are discussed further below in reference to FIGS. 3A and 3B.

Some embodiments may additionally determine a cause and/or time associated with discrepancies in the inventory of inventory holder 130. As one example, if discrepancies are determined in an image capture zone 125*a* that is before picking station 150, it may be determined that the discrepancies are not associated with interactions with inventory holder 130 by worker 170. As another example, if discrepancies are determined in an image capture zone 125*c* that is after picking station 150, it may be determined that the discrepancies are due to interactions with inventory holder 130 by worker 170. For example, worker 170 may have incorrectly removed inventory items 250 from or incorrectly placed inventory items 250 into inventory holder 130.

In some embodiments, application 220 may determine whether theft was the cause of discrepancies in the inventory of inventory holder 130. For example, application 220 may access images 118*c* captured before inventory holder 130 was delivered to array 135 and images 118*a* captured after inventory holder 130 was removed from array 135. Application 220 may then determine physical inventories from images 118*c* and 118*a* and determine whether any discrepancies exist. If discrepancies exist, application 220 may determine that inventory items 250 were removed from inventory holder 130 while is was at a storage location within array 135. In some embodiments, application 220 may determine the previous storage location of inventory holder 130 and access surveillance video of the storage location. In some embodiments, application 220 may analyze the surveillance video in order to determine a time when the theft occurred. For example, application 220 may utilize motion detection on the surveillance video of the storage location to determine a time when a person was in the vicinity of the storage location.

In certain embodiments, various actions may be taken in response to determining that discrepancies exist between the physical inventory and virtual inventory of inventory holder 130. In some embodiments, application 220 may transmit a message indicating the discrepancies. For example, an email message may be transmitted to a loss prevention department. In some embodiments, a visual or audible indication may be presented. For example, a visual indication of inventory discrepancies may be displayed to worker 170 in picking station 150.

In certain embodiments, inventory holder 130 may be placed in quarantine in response to a determination that discrepancies in inventory exist. For example, inventory holder 130 may be delivered via mobile drive unit 120 to a troubleshooting station. In some embodiments, the troubleshooting station may be another picking station 150. At the troubleshooting station, the discrepancies may be highlighted and/or displayed so that worker 170 may analyze and/or remediate the discrepancies. In embodiments where an inventory holder 130 is delivered to a troubleshooting station, another inventory holder 130 may be retrieved from array 135 and delivered to picking station 150 instead of the original inventory holder 130. In other embodiments, the inventory holder 130 with inventory discrepancies may be delivered first to picking station 150 where worker 170 may be permitted to proceed with picking inventory items 250 to fulfill electronic order 145.

Then, after order 145 is fulfilled, the inventory holder 130 may then be delivered to the troubleshooting station for inventory analysis.

Figure 3A:
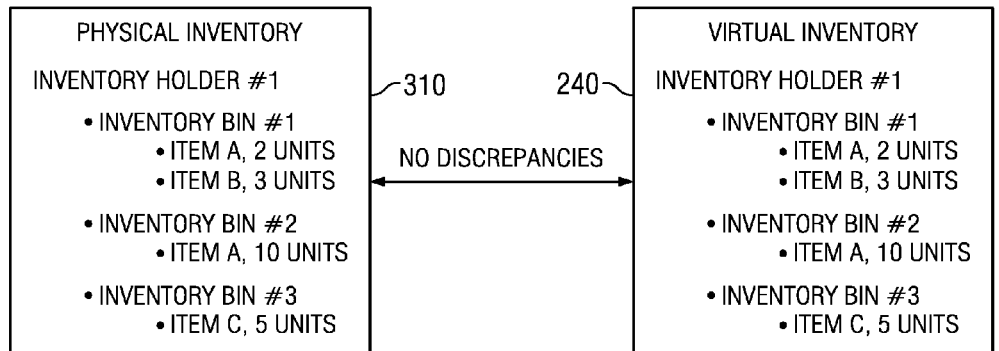
FIGS. 3A and 3B illustrate a physical inventory and a virtual inventory of an inventory holder of the example system of FIG. 1, according to certain embodiments of the present disclosure.
Figure 3B:
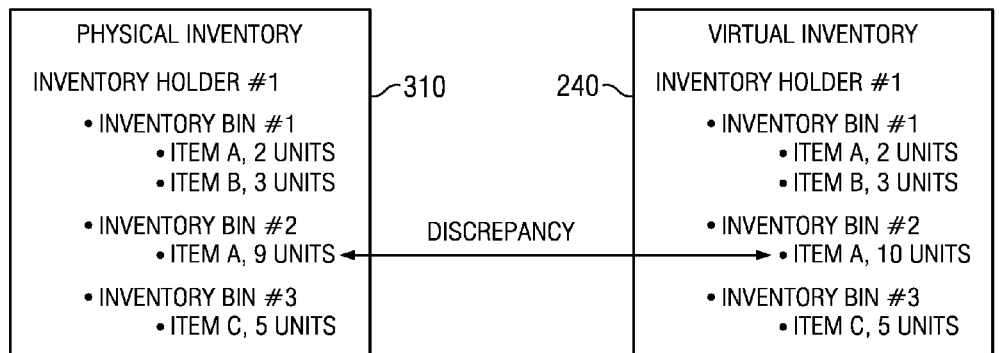

FIGS. 3A and 3B illustrate example embodiments of a physical inventory 310 and a virtual inventory 240 of inventory holder 130. Physical inventory 310 may be determined, for example, by application 220 analyzing one or more images 118. Examples of how application 220 may determine physical inventory 310 using one or more images 118 are discussed further below. Virtual inventory 240 may be stored, for example, in one or more storage devices 230 accessible to computing system 210. In some embodiments, virtual inventory 240 may be associated with a single inventory holder 130 and may be a portion of a master inventory list of multiple inventory holders 130.

As discussed above, image capture device 110 utilizes image capture process 115 to capture one or more images 118 of inventory holder 130 while it is in image capture zone 125. Using the captured one or more images 118, application 220 may determine physical inventory 310 of inventory holder 130 using any appropriate method. While three example methods of determining physical inventory 310 of inventory holder 130 from image(s) 118 are discussed below, any appropriate method may be utilized. The disclosure is not limited to the three example methods below. In addition, any combination of the three example methods below may be utilized to determine physical inventory 310 of inventory holder 130.

In a first embodiment, application 220 may determine physical inventory 310 of inventory holder 130 from image(s) 118 by analyzing exposed barcodes 255 of inventory items 250 located in inventory holder 130. For example, application 220 may analyze image(s) 118 in order to isolate and possibly enhance images of the captured exposed barcodes 255. Application 220 may then utilize any appropriate scanning technique to analyze each barcode 255 and determine from the barcode 255 information about the specific inventory item 250 associated with the barcode 255. For example, application 220 may determine a product code from barcode 255 and consult a database of known products. From this, application 220 may determine, for example, a product name associated with the specific inventory item 250. In addition, application 220 may determine a quantity of each type of inventory item 250 using barcodes 255. As a result, application 220 may determine physical inventory 310 of inventory holder 130 from barcode(s) 255 found in image(s) 118.

In a second embodiment, application 220 may determine physical inventory 310 of inventory holder 130 from image(s) 118 by utilizing optical character recognition. For example, application 220 may analyze image(s) 118 in order to isolate and possibly enhance images of individual inventory item(s) 250. Application 220 may then utilize any appropriate optical character recognition technique to determine information about the specific inventory item 250. For example, application 220 may isolate an image of a book that is stored in inventory holder 130. From this, application 220 may utilize optical character recognition to determine, for example, a title of the book, an International Standard Book Number (ISBN) of the book, and the like. In some embodiments, application 220 may utilize any determined characters to consult a database of known products and determine a product name associated with the specific inventory item 250. In addition, application 220 may determine a quantity of each type of inventory item 250 using the determined characters. As a result, application 220 may determine physical inventory 310 of inventory holder 130 using optical character recognition of image(s) 118.

In a third embodiment, application 220 may determine physical inventory 310 of inventory holder 130 from image(s) 118 by comparing image(s) 118 to known product images. For example, application 220 may analyze image(s) 118 in order to isolate and possibly enhance images of individual inventory item(s) 250. Application 220 may then compare image(s) 118 to a database of known product images. From this, application 220 may determine a product name associated with the specific inventory item 250. In addition, application 220 may determine a quantity of each type of inventory item 250 using the comparison of images. As a result, application 220 may determine physical inventory 310 of inventory holder 130 by comparing image(s) 118 to known product images.

As an example for illustrative purposes only, consider the illustrated physical inventory 310 of FIG. 3A. In this embodiment, application 220 determined physical inventory 310 using any one or combination of the methods described above. As illustrated in FIG. 3A, physical inventory 310 of an inventory holder 130 designated "INVENTORY HOLDER #1" includes three inventory bins 134: "INVENTORY BIN #1," "INVENTORY BIN #2," and "INVENTORY BIN #3." "INVENTORY BIN #1" was found to include two units of "ITEM A" and three units of "ITEM 3." "INVENTORY BIN #2" was found to include ten units of "ITEM A." "INVENTORY BIN #3" was found to include five units of "ITEM C."

Virtual inventory 240 of FIG. 3A likewise is associated with "INVENTORY HOLDER #1" and includes three inventory bins 134: "INVENTORY BIN #1," "INVENTORY BIN #2," and "INVENTORY BIN #3." According to virtual inventory 240, "INVENTORY BIN #1" should include two units of "ITEM A" and three units of "ITEM 3," "INVENTORY BIN #2" should include ten units of "ITEM A," and "INVENTORY BIN #3" should include five units of "ITEM C."

As illustrated in FIG. 3A, physical inventory 310 of "INVENTORY HOLDER #1" is identical to virtual inventory 240 of "INVENTORY HOLDER #1." Thus, application 220 determines that there are no discrepancies between physical inventory 310 and virtual inventory 240. On the other hand, FIG. 3B illustrates an embodiment where application 220 determines that there are discrepancies between physical inventory 310 and virtual inventory 240. As illustrated in FIG. 3B, physical inventory 310 of an inventory holder 130 designated "INVENTORY HOLDER #1" includes three inventory bins 134: "INVENTORY BIN #1," "INVENTORY BIN #2," and "INVENTORY BIN #3." "INVENTORY BIN #1" was found to include two units of "ITEM A" and three units of "ITEM 3." "INVENTORY BIN #2" was found to include nine units of "ITEM A." "INVENTORY BIN #3" was found to include five units of "ITEM C."

Virtual inventory 240 of FIG. 3A likewise is associated with "INVENTORY HOLDER #1" and includes three inventory bins 134: "INVENTORY BIN #1," "INVENTORY BIN #2," and "INVENTORY BIN #3." According to virtual inventory 240, "INVENTORY BIN #1" should include two units of "ITEM A" and three units of "ITEM 3," "INVENTORY BIN #2" should include ten units of "ITEM A," and "INVENTORY BIN #3" should include five units of "ITEM C."

Figure 4:
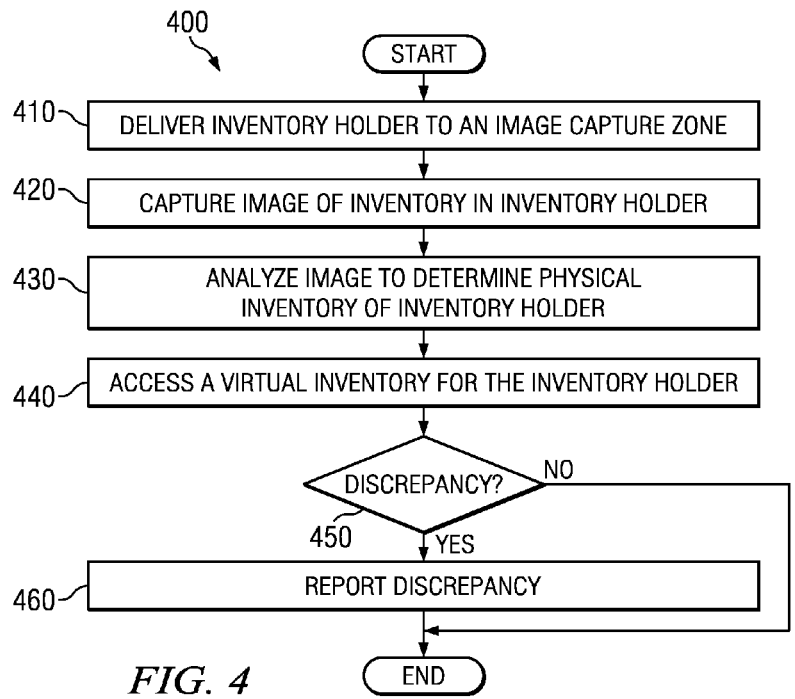
FIG. 4 illustrates an example method for providing automated inventory quality control, which may be performed by the example system of FIG. 1 according to certain embodiments of a present disclosure.

As illustrated in FIG. 3B, physical inventory 310 of "INVENTORY HOLDER #1" is not identical to virtual inventory 240 of "INVENTORY HOLDER #1" because "INVENTORY BIN #2" was found to include nine units of "ITEM A" when virtual inventory 240 indicates it should include ten units. Thus, application 220 determines that there are discrepancies between physical inventory 310 and virtual inventory 240. By catching discrepancies such as this in the inventory of inventory holder 130, system 100 is able to improve quality control and thus improve throughput, response times, and customer satisfaction. FIG. 4 through 6 below illustrate other embodiments of methods for automated inventory quality control.

FIG. 4 illustrates a method 400 for performing automated inventory quality control according to certain embodiments. Method 400 begins in step 410 where a mobile drive unit delivers an inventory holder to an image capture zone. For example, the mobile drive unit may refer to mobile drive unit 120 and the inventory holder may refer to inventory holder 130 discussed above. The image capture zone may refer to image capture zone 125 discussed above. In some embodiments, the inventory holder temporarily stops in the image capture zone. In some embodiments, the inventory holder merely passes through the image capture zone without stopping.

In step 420 an image is captured of the inventory in the inventory holder of step 410. In some embodiments, an image capture device 110, as discussed above, captures one or more images 118 of the inventory holder, as discussed above. In some embodiments, the captured image indicates some or all of the inventory located in the inventory holder. In some embodiments, the captured image includes more than one image such video data. In certain embodiments, the captured image includes one or more barcodes of the inventory located in the inventory holder.

In step 430 the images captured in step 420 are analyzed in order to determine the physical inventory of the inventory holder of step 410. In one example, computing system 210, utilizes one or more captured barcodes in the images captured in step 420 in order to determine the inventory of inventory holder 130. In another example, optical character recognition may be utilized to determine the physical inventory of the inventory holder of step 410. In yet another example, images of the inventory captured in step 420 may be compared to a database of known product images to determine the physical inventory of the inventory holder.

In step 440 a virtual inventory associated with the inventory holder of step 410 is accessed. In one embodiment, a master inventory is accessed in order to determine a virtual inventory for the inventory holder. For example, a master inventory of multiple inventory holders may be accessed from a storage device such as a database. In certain embodiments, the master inventory database may be analyzed in order to determine the virtual inventory associated with the inventory holder of step 410.

In step 450 discrepancies are determined between the physical inventory of step 430 and the virtual inventory of step 440. For example, the inventory items determined in step 430 may be compared to inventory items in step 440 in order to determine any discrepancies. In certain embodiments, any method described above may be utilized to determine the discrepancies in step 450. If any discrepancies are determined in step 450, method 400 may proceed to step 460. Otherwise, method 400 may end. In step 460, any discrepancies determined in step 450 may be reported. For example, a visual or audible indication of the discrepancies may be presented to worker 170 at picking station 150. After step 460, method 400 ends.

FIG. 5 illustrates one embodiment of a method 500 for automated inventory quality control. In this embodiment, images of an inventory holder are captured before and after a worker interacts with the inventory holder at a picking station. These images may be utilized, for example, to determine whether the worker in the picking station picks the correct inventory from and/or places the correct inventory in inventory holder 130.

Method 500 begins in step 510 when an inventory holder is delivered to an image capture zone before the inventory holder is delivered to a picking station and/or before a worker begins interacting with the inventory holder. For example, a mobile drive unit 120 may deliver an inventory holder 130 to image capture zone 125a described above. As another example, a mobile drive unit 120 may deliver an inventory holder 130 to image capture zone 125b described above.

In step 520, a first image is captured in the inventory holder while it is located in the image capture zone of 510. In certain embodiments, the image is captured by an image capture device 110 described above. The first image captured in step 520 may indicate an inventory of the inventory holder before a worker interacts with the inventory holder at a picking station.

At step 530, the first image captured in step 520 is analyzed in order to determine a physical inventory of the inventory holder before a worker interacts with the inventory holder. For example, methods such as analyzing exposed barcodes, utilizing optical character recognition, comparing the first image to a database of known product images, and/or any other suitable method may be used to determine the physical inventory of the inventory holder before a worker interacts with the inventory holder.

In step 540, the inventory holder may be delivered to a picking station where a worker may interact with the inventory holder. For example, the worker may pick one or more items of inventory from the inventory holder according to an electronic order. In certain embodiments, the worker may place one or more items of inventory into the inventory holder.

In step 550, the inventory holder is delivered to an image capture zone after the worker has interacted with the inventory holder at the picking station. In some embodiments, the image capture zone of 550 is the same image capture zone of step 510. In other embodiments, the image capture zone of step 550 is different from the image capture zone of step 510.

In step 560, a second image is captured of the inventory in inventory holder while it is located in the image capture zone of step 550. In certain embodiments, the image is captured by an image capture device 110 described above. The second image captured in step 560 may indicate an inventory of the inventory holder after a worker interacts with the inventory holder at a picking station.

In step 570, the second image captured in step 560 is analyzed in order to determine a physical inventory of the inventory holder after the worker interacted with the inventory holder while it was located at the picking station. For example, methods such as analyzing exposed barcodes, utilizing optical character recognition, comparing the first image to a database of known product images, and/or any other suitable method may be used to determine the physical inventory of the inventory holder before a worker interacts with the inventory holder.

In step 580, any discrepancies of the physical inventory of the inventory holder are determined. In one example, step 580 may include determining whether the worker at the picking station picked the correct inventory from the inventory holder. In one embodiment, items in an order may be subtracted from the physical inventory determined in step 530. Once the items from an order have been subtracted from the physical inventory determined in step 530, it may be compared to the physical inventory determined in step 570. This may indicate whether the worker at the picking station picked the correct inventory from inventory holder. In another embodiment, step 580 may include determining inventory that was to be added to the inventory holder (e.g., for stocking purposes). Once the items that were to be stocked are added to the physical inventory determined in step 530, a comparison may be made to the physical inventory determined in step 570. This may indicate whether the worker at the picking station added the correct inventory to inventory holder.

If any discrepancies are determined in step 580, method 500 may proceed to step 590. Otherwise, method 500 may end. In step 590, any discrepancies determined in step 580 may be reported. For example, a visual or audible indication of the discrepancies may be presented to worker 170 at picking station 150. After step 590, method 500 ends.

FIG. 6 illustrates one embodiment of a method 600 for automated inventory quality control. In this embodiment, images are captured while an inventory holder is located at a picking station. These images are utilized to determine whether a worker has picked the correct inventory from the inventory holder according to an order. Method 600 begins in step 610 where an inventory holder is delivered to a picking station. For example, a mobile drive unit 120 may deliver an inventory holder 130 to a picking station 150 as described above.

In step 620, images are captured of the inventory in inventory holder while the inventory holder is at the picking station. In one example, images from video data may be analyzed to determine which inventory items are picked from and/or placed into the inventory holder. In another example, a first image is captured when the inventory holder is first delivered to the picking station and a second image is captured of the inventory of the inventory holder immediately before the inventory holder departs from the picking station. Differences between the first and second images may be compared below in step 630 to an order in order to determine whether a worker has picked the correct inventory from the inventory holder. In certain embodiments, differences between the first and second images may be compared in order to determine whether a worker has placed the correct inventory into the inventory holder In step 630, the images captured in step 620 of the inventory of the inventory holder are analyzed in order to determine which inventory items were picked from the inventory holder. Alternatively, the images captured of the inventory of the inventory holder are analyzed in order to determine which inventory items were placed into the inventory holder. Any appropriate method described above may be utilized in step 630 to determine the inventory picked from and/or placed into the inventory holder.

In step 640 an order is accessed. For example, electronic order 145 described above may be accessed. In step 650, any discrepancies are determined between the order accessed in step 640 and the inventory picked from the inventory holder. In certain embodiments, if any discrepancies are determined, a visual or audible indication may be presented to the worker at the picking station.

If any discrepancies are determined in step 650, method 600 may proceed to step 660. Otherwise, method 600 may end. In step 660, any discrepancies determined in step 650 may be reported. For example, a visual or audible indication of the discrepancies may be presented to worker 170 at picking station 150. After step 660, method 600 ends.

FIG. 7 illustrates an example computer system 700 that may be used for one or more portions of the systems and method disclosed herein. In particular embodiments, one or more computer systems 700 perform one or more steps of one or more methods described or illustrated herein. In particular embodiments, one or more computer systems 700 provide functionality described or illustrated herein, such as, for example, computing system 210. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, memory 704 includes main memory for storing instructions for processor 702 to execute or data for processor 702 to operate on. In certain embodiments, memory 704 may be memory 214 above. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. In certain embodiments, storage 706 may be storage 230 above.

Storage 706 may include removable or non-removable (i.e., fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While particular embodiments of inventory system 100 are illustrated, it should be appreciated that the teaching of the present disclosure may be applied to any type and number of inventory systems. For example, inventory system 100 may represent a merchandise return facility. In such embodiments, inventory items may represent merchandise returned by customers. Such merchandise may be stored in inventory holders 130 when received at the facility from individual customers. At appropriate times, large numbers of units may be removed from a particular inventory holder 130 and transferred at picking station 150 to an order holder 144. For example, certain inventory items may be associated with a product recall, causing those inventory items to be returned in high volume. As another example, system 100 may represent a manufacturing facility, and inventory items may represent individual components of a manufacturing kit. Thus, individual items of the manufacturing kit may be stored in inventory holders 130. Electronic order 145 for manufactured products may be assembled from the individual items at picking station 150. Final products may be transported by mobile drive units 120 using order holders 144 and may be shipped to the appropriate destination. Thus, although a number of example embodiments are described in the present disclosure, inventory system 100 may, in general, represent any suitable facility or system for storing or processing inventory items, and inventory items may represent objects of any type suitable for storage, retrieval and/or processing in a particular inventory system 100.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:
1. A system, comprising:
an inventory holder including an inventory bin, the inventory bin operable to store one or more units of inventory;
a mobile drive unit operable to retrieve the inventory holder from an array of inventory holders and deliver the inventory holder to one or more image capture zones and a picking station;
one or more image capture devices operable to capture, while the inventory holder is located in a particular image capture zone, an image of the one or more units of inventory stored in the inventory bin; and one or more computing systems operable to:
determine, from the captured image, a physical inventory of the inventory bin, wherein determining the physical inventory of the inventory bin comprises identifying from the captured image a quantity and a type of each of the one or more units of inventory stored in the inventory bin;

determine discrepancies between the determined physical inventory of the inventory bin and a virtual inventory associated with the inventory bin by comparing the determined physical inventory of the captured image with the virtual inventory; and present an indication of any determined discrepancies, the indication comprising a visual or audible indication.

2. The system of claim 1, wherein:
the particular image capture zone is a location that the inventory holder passes through before the inventory holder arrives at the picking station; and
the virtual inventory comprises inventory information of the inventory bin that is stored in a master inventory.

3. The system of claim 1, wherein:
the particular image capture zone is a location that the inventory holder passes through after the inventory holder has departed from the picking station; and
the virtual inventory comprises inventory information of the inventory bin that is determined from a second image of the one or more units of inventory, the second image being captured before the inventory holder arrives at the picking station.

4. The system of claim 3, further comprising:
accessing an order indicating one or more ordered products; and
determining, based on the determined discrepancies and the order, whether the one or more ordered products were removed from the inventory holder at the picking station.

5. Logic encoded in a non-transitory computer-readable storage medium and operable, when executed by one or more processing units, to:
send one or more instructions that cause a mobile drive unit to retrieve an inventory holder from an array of inventory holders and deliver the inventory holder to an image capture zone, the inventory holder comprising one or more inventory bins operable to store one or more units of inventory;

access an image of the one or more units of inventory stored in a particular inventory bin of the inventory holder, the image captured by one or more image capture devices while the inventory holder is located in the image capture zone;

determine, from the captured image, a physical inventory of the particular inventory bin, the physical inventory comprising the one or more units of inventory, wherein determining the physical inventory of the particular inventory bin comprises identifying from the captured image a quantity and a type of each of the one or more units of inventory in the particular inventory bin; and determine discrepancies between the determined physical inventory of the particular inventory bin and a virtual inventory associated with the particular inventory bin by comparing the determined physical inventory of the captured image with the virtual inventory.

6. The logic of claim 5, wherein:
the image capture zone is a location that the inventory holder passes through before the inventory holder arrives at a picking station; and
the virtual inventory comprises inventory information of the particular inventory bin that is stored in a master inventory.

7. The logic of claim 6, the logic further operable to determine that the discrepancies are disassociated with interactions with the particular inventory bin at the picking station.

8. The logic of claim 5, wherein:
the image capture zone is a location that the inventory holder passes through after the inventory holder has departed from a picking station; and
the virtual inventory comprises inventory information of the particular inventory bin that is determined from a second image of the one or more units of inventory, the second image being captured before the inventory holder is delivered to the picking station.

9. The logic of claim 8, the logic further operable to determine that the discrepancies are due to interactions with the particular inventory bin at the picking station.

10. The logic of claim 5, wherein determining the physical inventory of the particular inventory bin comprises at least one of:
analyzing one or more captured barcodes;
utilizing optical character recognition;
identifying a number of units of inventory; and
comparing the captured image to one or more images of known products.

11. A method comprising:
retrieving, by a mobile drive unit, an inventory holder from an array of inventory holders and delivering the inventory holder to a picking station, the inventory holder comprising one or more inventory bins operable to store one or more units of inventory;

accessing, by one or more computing systems, one or more images of the one or more units of inventory stored in a particular inventory bin of the inventory holder, the one or more images captured by one or more image capture devices while the inventory holder is located proximate to the picking station;

determining, by the one or more computing systems from the one or more captured images, one or more units of inventory removed from the inventory holder at the picking station, wherein determining one or more units of inventory removed from the inventory holder comprises identifying from the one or more captured images a quantity and a type of each of the one or more units of inventory in the inventory holder;

accessing order information, the order information indicating one or more ordered products; and determining, by the one or more computing systems, discrepancies between the order information and the one or more units of inventory removed from the inventory holder at the picking station by comparing the determined one or more units of inventory removed from the inventory holder with the order information.

12. The method of claim 11, wherein:
the one or more captured images comprise video data; and
determining one or more units of inventory removed from the inventory holder at the picking station comprises at least one of:
analyzing one or more barcodes in the video data;
utilizing optical character recognition on the video data; and comparing the video data to one or more images of known products.

13. The method of claim 11, further comprising presenting a visual indication at the picking station of discrepancies between the order information and the units of inventory removed from the inventory holder.

14. The method of claim 11, further comprising:
   determining, by the one or more computing systems after a determination that there are no discrepancies between the order information and the units of inventory removed at the picking station, discrepancies between a physical inventory of the inventory holder and a virtual inventory of the inventory holder; and
   in response to a determination that there are discrepancies between the physical inventory of the inventory holder and the virtual inventory of the inventory holder:
      presenting at least one of a first indication and a second indication at the picking station, wherein:
         the first indication indicates that the units of inventory removed at the picking station match the order; and
         the second indication indicates the discrepancies between the physical inventory and the virtual inventory; and
      transmitting one or more commands to a mobile drive unit to deliver the inventory holder to a troubleshooting station.

15. A system for determining discrepancies between physical inventory and virtual inventory, comprising:
   a mobile drive unit operable to retrieve an inventory holder from an array of inventory holders and deliver the inventory holder to one or more image capture zones;
   a memory operable to store:
      a virtual inventory identifying one or more units of inventory associated with an inventory bin of the inventory holder; and
      an image representing a physical inventory associated with the inventory bin; and
   a processor coupled to the memory and operable to:
      determine from the image a physical inventory comprising one or more units of inventory from the inventory bin, wherein determining the physical inventory from the image comprises identifying a quantity and a type of each of the one or more units of inventory from the inventory bin; and
      determine discrepancies between the determined physical inventory of the inventory bin and the virtual inventory associated with the inventory bin by comparing the determined physical inventory of the image with the virtual inventory.

16. The system of claim 15, wherein a discrepancy indicates that the physical inventory is missing one or more units of inventory.

17. The system of claim 15, wherein a discrepancy indicates that the physical inventory has a surplus of one or more units of inventory.

18. The system of claim 15, the processor further operable to:
   determine that the discrepancies are associated with theft of one or more of the units of inventory;
   determine a storage location in which the inventory holder previously resided in the array;
   analyze surveillance video of the storage location; and
   determine, from the surveillance video, a time associated with the theft.

19. The system of claim 15, the processor further operable to:
   in response to determining one or more discrepancies between the determined physical inventory and the virtual inventory, transmit one or more commands to the mobile drive unit to deliver the inventory holder to a troubleshooting station; and
   present an indication of the determined discrepancies for display at the troubleshooting station.

20. The system of claim 19, the processor further operable to transmit one or more other commands to deliver a second inventory holder to a picking station.

* * * * *